Figure 1:
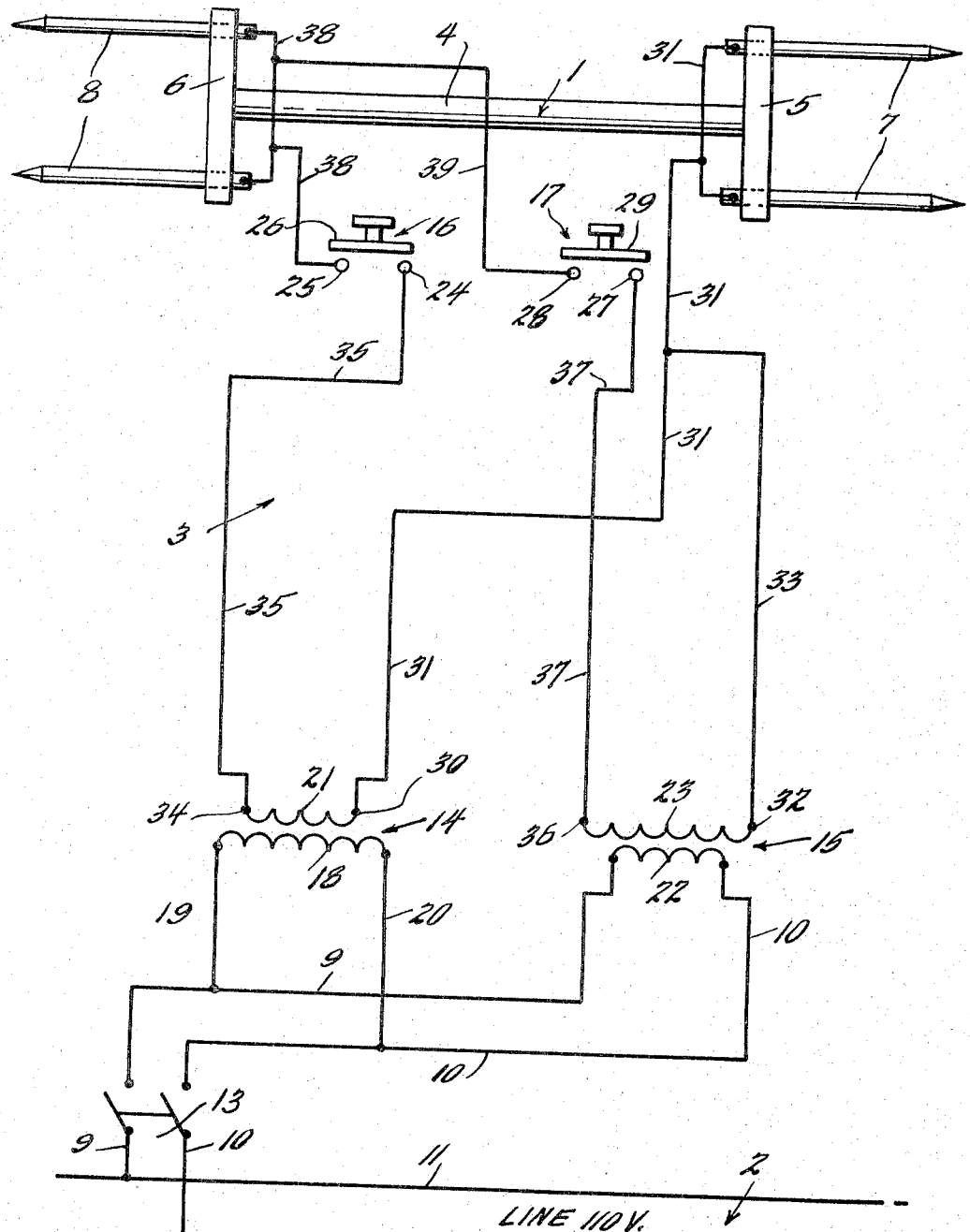

April 18, 1967  R. W. RAINS  3,314,103
METHOD OF ELECTRICALLY STUNNING ANIMALS
Filed July 1, 1965  2 Sheets-Sheet 1

INVENTOR
Richard W. Rains,
BY John B. Dickman III
AGENT

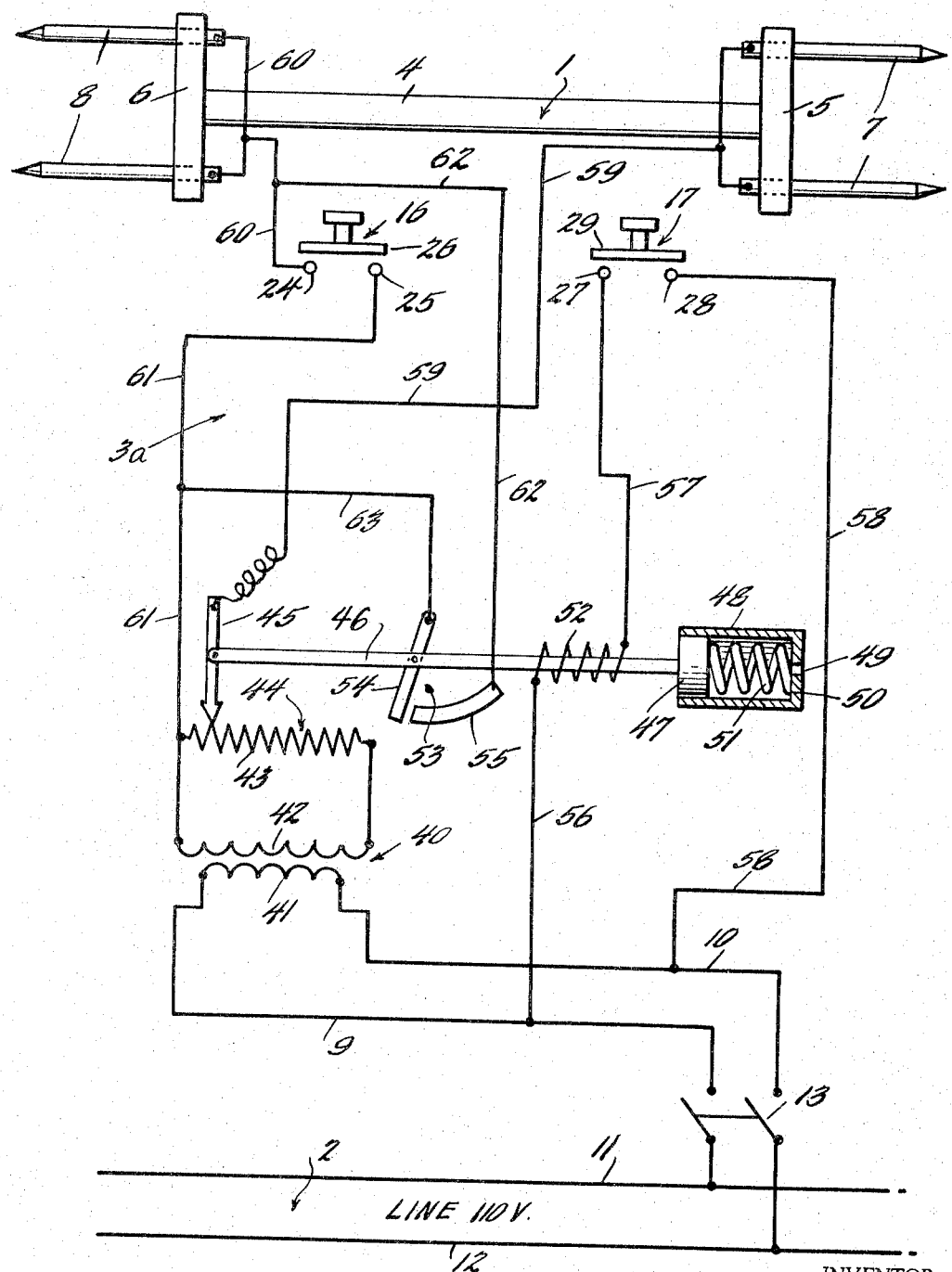

United States Patent Office 3,314,103
Patented Apr. 18, 1967

3,314,103
METHOD OF ELECTRICALLY STUNNING ANIMALS
Richard W. Rains, Timonium, Md., assignor to Schluderberg-Kurdle Co., Inc., Baltimore, Md., a corporation of Maryland
Filed July 1, 1965, Ser. No. 468,696
2 Claims. (Cl. 17—45)

This invention relates to a method of electrically stunning animals, to render them unconscious, just prior to slaughtering. The method of the invention, although especially adapted for the stunning of hogs prior to slaughtering, may also be used equally well for the stunning of cattle or sheep.

Heretofore in electrically stunning animals a first electrode was applied to the head of an animal and a second electrode was applied to the back of the animal in spaced relation to the first electrode. A voltage of high potential was then passed between the electrodes through the brain and back of the animal. This sudden application of a high voltage electrical current to an animal often causes convulsions during which the animal thrashes about and frequently breaks its back or otherwise injures itself thereby rendering portions of its flesh unsaleable for food. Also this sudden application of a high voltage current to an animal frequently causes hemorrhaging in the lungs of the animal which makes it difficult for an inspector to determine whether or not the animal is fit for human consumption.

It is therefore the principal object of this invention to provide a method of stunning animals, prior to slaughtering, by which convulsions and lung hemorrhaging of an animal during stunning are practically eliminated.

In accordance with the invention a first electrode is applied to the head of an animal and a second electrode is applied to the back of the animal. A low voltage tranquilizing current is first passed between the electrodes through an animal's brain for an indeterminate length of time, after which a high voltage stunning current is passed between the elecrodes through the animal's brain for a predetermined length of time. In the slaughtering of animals, especially hogs, successive animals are generally brought to the slaughtering station on a specially designed conveyor and are held on the conveyor, at the discharge end thereof, until the slaughterer is ready to bleed the next animal. During the time the animal is held on the conveyor at the discharge end thereof, the low voltage tranquilizing current is applied to the animal for an indefinite length of time which may vary in accordance with the length of time it takes to slaughter the preceding animal delivered to the slaughtering station. This low voltage current soothes and pacifies the animal but does not render it unconscious. Then when the slaughterer is ready to bleed the animal the high voltage stunning current is applied to the animal for a predetermined short length of time which renders the animal unconscious but does not kill or stop the heart action of the animal. Due to the animal having been soothed and pacified by the tranquilizing voltage applied thereto, the application of the stunning voltage thereto is not likely to cause convulsions or lung hemorrhaging. It has been found that in the stunning of hogs, a tranquilizing voltage in the order of fifty volts applied to an animal for an indefinite length of time, and a stunning voltage in the order of one hundred and sixty volts subsequently applied to the animal for approximately one-half second produces very satisfactory results.

One type of apparatus utilizing the method of this invention is disclosed in my copending application Ser. No. 468,695 which was filed concurrently herewith; and one type of applicator, sometimes termed a probe, by which the tranquilizing and stunning voltages may be applied to an animal is disclosed in my copending application Ser. No. 468,694 which was also filed concurrently herewith.

Having stated the principal objects of the invention other and more specific objects thereof will be apparent from the following specification and the accompanying drawing forming a part thereof in which:

FIG. 1 diagrammatically illustrates one manner in which applicant's method of electrically stunning an animal just prior to the slaughtering of the animal may be utilized; and FIG. 2 is a view similar to FIG. 1 diagrammatically illustrating another manner in which applicant's method of electrically stunning animals may be utilized.

Referring now to the drawing by reference characters the numeral 1 indicates generally an applicator, sometimes referred to as a probe, by which the tranquilizing and stunning voltages are adapted to be applied to an animal. An alternating current source, which may be a 60 cycle 110 or 220 volt line, is generally indicated by the numeral 2, and a control circuit which is interposed between the current source 2 and the applicator or probe 1 is generally indicated by the numeral 3.

The applicator 1 comprises an elongated handle 4 having a block 5 of insulating material secured to one end thereof, and a similar block 6 applied to the other end thereof. A first pair of transversely spaced elongated electrodes 7, which are adapted to be applied to the head of an animal, are secured to the block 5 and extend outwardly therefrom; and a second pair of transversely spaced elongated electrodes 8, which are adapted to be applied to the back of the animal, are secured to the block 6 and extend outwardly therefrom.

The control circuit 3, as shown in FIG. 1, comprises a pair of conductors 9 and 10, which are connected to the sides 11 and 12 respectively of the line 2 through a double pole switch 13, a step-down transformer 14 by which the line voltage is reduced to the desired lower tranquilizing voltage, a step-up transformer 15 by which the line voltage is increased to the desired higher stunning voltage, a manually actuated push button switch 16 which is interposed between the step-down transformer 14 and the electrodes 7 and 8, and a similar manually actuated push button switch 17 which is interposed between the step-up transformer 15 and the electrodes 7 and 8.

The step-down transformer comprises a primary winding 18, which is connected between the conductors 9 and 10 by the conductors 19 and 20 respectively, and a secondary winding 21; and the step-up transformer 15 comprises a primary winding 22, which is connected between the conductors 9 and 10, and a secondary winding 23.

The switch 16, which is preferably conveniently mounted upon the handle 4 of the applicator 1, comprises the contacts 24 and 25 and the bridging bar 26; and the switch 17, which is also preferably mounted upon the handle 4 of the applicator 1, comprises the contacts 27 and 28 and the bridging bar 29.

The terminal 30 of the secondary winding 21 of the step-down transformer 14, is connected to the electrodes 7 by the conductor 31; and the terminal 32, of the secondary winding 23 of the step-up transformer 15, by the conductor 31 and the branch conductor 33. The terminal 34, of the secondary winding 21 of the step-down transformer 14, is connected to the contact 24, of the switch 16, by the conductor 35; and the terminal 36, of the secondary winding 23 of the step-up transformer 15, is connected to the contact 27 of the switch 17 by the conductor 37. The contact 25 of the switch 16 is connected to the electrodes 8 by the conductor 38; and the contact 28 of the switch 17 is connected to the electrodes 8 by the conductor 38 and the branch conductor 39.

In use the switch 13 is first closed to connect the primary windings 18 and 22 of the transformers 14 and 15 respectively to the voltage source 2, after which the applicator is applied to the animal with the electrodes 7 in contact with the head of the animal and the electrodes 8 in contact with the back of the animal. The switch 16 is then closed. The tranquilizing low voltage induced in the secondary winding 21 of the transformer 14 by the closing of the switch 16 then flows from the terminal 30 of the secondary winding 21 through the conductor 31 to the electrodes 7, then through the brain and back of the animal to the electrodes 8, and from the electrodes 8 back to the terminal 34 of the winding 21 through the conductor 38, switch 16 and conductor 35. As long as the switch 16 is maintained closed, which may be for any indefinite length of time dependent on slaughtering condition, the transquilizing voltage will continue to flow between the electrodes 7 and electrodes 8 through the animal. As previous stated this tranquilizing voltage is high enough to soothe and pacify the animal but not high enough to render the animal unconscious.

When the slaughterer is ready to bleed the animal the switch 16 is released, terminating the application of the tranquilizing voltage to the animal, and the switch 17 manually closed. The stunning voltage induced in the secondary winding 23 of the step-up transformer 15 by the closing of the switch 17 then flows from the terminal 32 of the secondary winding 23 through the conductors 33 and 31 to the electrodes 7, then through the brain and back of the animal to the electrodes 8, and from the electrodes 8 back to the terminal 36 of the secondary winding 23 through the conductors 38 and 39, switch 17, and conductor 37. This stunning voltage is applied to the animal for a predetermined short period of time only.

This stunning voltage must be high enough to render the animal unconscious but not high enough to kill the animal and stop its heart action which is essential for the proper bleeding of the animal. It has been found by experience that in the stunning of hogs a tranquilizing voltage in the order of fifty volts, and a stunning voltage in the order of one hundred and sixty volts applied for approximately 1 to 2 seconds produces the most satisfactory results. It has also been found that these voltages will vary for different types of animals, and for different sizes and ages thereof.

The control circuit 3a, as shown in FIG. 2, comprises a step-up transformer 40 having a primary winding 41 and a secondary winding 42. The primary winding 41 is connected between the conductors 9 and 10, and the secondary winding 42 is connected to the winding 43 of a potentiometer 44 having a slidably mounted wiper 45.

The wiper 45 is connected to one end of an armature 46 by which the wiper 45 is adapted to be moved back and forth along the potentiometer winding 43. The other end of the armature 46 is connected to a piston 47 which is slidably mounted in a dash pot 48 having a small aperture 49 in the end wall 50 thereof. A coiled compression spring 51 is mounted in the dash pot 48 between the end wall 50 thereof and the inner end of the piston 47. The armature 46 is adapted to be actuated in one direction from its normal low voltage position against the resistance of the spring 51 by a relay coil 52, which is operatively associated therewith, and in the opposite direction back to its normal low voltage position by the spring 51. The armature 46 is also adapted to actuate a switch 53 during the back and forth movement thereof. The switch 53 comprises a pivoted arm 54, which is operatively connected to the armature 46, and an elongated arcuate contact 55.

One end of the relay coil 52 is connected to the conductor 9 by a conductor 56, and the other end thereof is connected to the contact 27 of the switch 17 by a conductor 57. The other contact 28 of the switch 17 is connected to the conductor 10 by a conductor 58. The wiper 45 of the potentiometer 44 is connected to the electrodes 7 by a conductor 59; and the electrodes 8 are connected to contact 24 of the switch 16 by a conductor 60. The other contact 25 of the switch 16 is connected to the end of the potentiometer winding 43 by a conductor 61. The contact 55 of the switch 53 is connected to the conductor 60 by a conductor 62, and the arm 54 of the switch 53 is connected to the conductor 61 by a conductor 63.

When it is desired to apply the relatively low tranquilizing voltage to an animal the switch 16 is manually closed. The low voltage current will then flow from the potentiometer winding 43 through the wiper 45 and conductor 59 to the electrodes 7, then from the electrodes 7 through the brain and back of the animal to the electrodes 8, and back to the potentiometer winding 43 through the conductor 60, switch 16 and conductor 61. As long as the switch 16 is maintained closed the relatively low tranquilizing voltage will continue to be applied to the animal.

When it is desired to apply the relatively high stunning voltage to the animal the switch 16 is released and the switch 17 is manually closed and maintained closed for a predetermined length of time. When the switch 17 is closed current will flow from the conductor 9 through the conductor 56 to the relay coil 52 and from the coil 52 through conductor 57 to the contact 27 of the switch 17, then through the bar 29 to the contact 28 and from there back to the negative conductor 10 through the conductor 58, thereby energizing the relay coil 52. The coil 52 being energized will actuate the armature 46 to slowly move the wiper 45 along the potentiometer coil 43, from its normal at rest low voltage position, against the resistance of the spring 51 thereby gradually increasing the voltage output of the potentiometer coil 43 through the wiper 45 until the wiper 45 reaches the limit of its outward movement at which time the voltage output is the desired relatively high stunning voltage, which is maintained for a short predetermined period of time by holding the switch 17 closed. After the elapse of the predetermined period of time during which the stunning voltage is being applied to the animal the switch 17 is released thereby breaking the circuit to and de-energizing the relay coil 52. The spring 51 then slowly moves the armature 46 and wiper 45 back to initial position thereby gradually decreasing the voltage output of the potentiometer from the relatively high stunning voltage to the relatively low tranquilizing voltage. During the initial movement of the armature 46 under the influence of the relay coil 52 it moves the arm 54 of the switch 53 into engagement with the contact 55 thereof and maintains it in engagement therewith until the armature has been returned to initial position by the spring 51. During the entire time that the arm 54 of the switch 53 is in engagement with the contact 55 thereof current will flow from the potentiometer coil 43 through the wiper 45 and conductor 59 to the electrodes 7, then through the brain and back of the animal to the electrodes 8, and from the electrodes 8 back to the potentiometer coil 43 through the conductors 60 and 62, contact 55, arm 54, and conductors 63 and 61.

From the foregoing it will be seen that, when applying the relatively high stunning voltage to an animal with the mechanism disclosed in FIG. 3, the relatively low tranquilizing voltage is gradually increased to the relatively high stunning voltage which is maintained for the short predetermined period of time and then gradually reduced back to the relatively low tranquilizing voltage. Experience has shown that very satisfactory results are obtained by gradually increasing the low tranquilizing voltage to the high stunning voltage during approximately one and one-half seconds, maintaining the stunning voltage for approximately one-half second, and then reducing the high stunning voltage back to the low tranquilizing voltage during approximately one second.

From the foregoing it will be apparent to those skilled in this art that I have provided a very simple and effective method of stunning animals preparatory to the slaughtering thereof and for accomplishing the objects of the invention.

It is to be understood that I am not restricted to the apparatus shown and described herein for practising the method of the invention, as various other mechanisms may be substituted therefor.

What is claimed is:

1. The method of stunning an animal prior to slaughtering comprising, applying a pair of spaced electrodes to the head and back of an animal, passing a relatively low tranquilizing voltage between said electrodes through the brain and back of the animal for an indeterminate length of time, gradually increasing the said relatively low tranquilizing voltage to a relatively high stunning voltage, maintaining said relatively high stunning voltage for a predetermined length of time, gradually reducing said relatively high stunning voltage, and then terminating the application of voltage to said animal.

2. The method of stunning an animal prior to slaughtering as defined by claim 1 in which the time during which the relatively low tranquilizing voltage is gradually increased to the relatively high stunning voltage is approximately one and one-half seconds, that the length of time during which the relatively high voltage is maintained is approximately one-half second, and that the length of time during which the relatively high stunning voltage is gradually reduced is approximately one second.

References Cited by the Examiner

UNITED STATES PATENTS

| | | |
|---|---|---|
| 2,866,461 | 12/1958 | Suzuki. |
| 3,012,271 | 12/1961 | Morse _____ 17—45 |
| 3,152,357 | 10/1964 | Wemmer _____ 17—1 |

FOREIGN PATENTS

| | | |
|---|---|---|
| 387,691 | 2/1933 | Great Britain. |

LUCIE H. LAUDENSLAGER, *Primary Examiner.*